United States Patent
Ohashi

(10) Patent No.: US 12,517,149 B2
(45) Date of Patent: Jan. 6, 2026

(54) INFORMATION PROCESSING APPARATUS, INFORMATION PROCESSING METHOD, AND PROGRAM

(71) Applicant: SONY INTERACTIVE ENTERTAINMENT INC., Tokyo (JP)

(72) Inventor: Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 376 days.

(21) Appl. No.: 17/792,924

(22) PCT Filed: Jan. 29, 2020

(86) PCT No.: PCT/JP2020/003173
§ 371 (c)(1),
(2) Date: Jul. 14, 2022

(87) PCT Pub. No.: WO2021/152723
PCT Pub. Date: Aug. 5, 2021

(65) Prior Publication Data
US 2023/0066821 A1    Mar. 2, 2023

(51) Int. Cl.
| | |
|---|---|
| *G01P 21/00* | (2006.01) |
| *G01P 15/18* | (2013.01) |
| *G06F 3/0346* | (2013.01) |
| *G06F 3/038* | (2013.01) |
| *A63F 13/211* | (2014.01) |
| *A63F 13/22* | (2014.01) |

(52) U.S. Cl.
CPC ............ *G01P 21/00* (2013.01); *G01P 15/18* (2013.01); *G06F 3/0346* (2013.01); *G06F 3/038* (2013.01); *A63F 13/211* (2014.09); *A63F 13/22* (2014.09); *A63F 2300/1018* (2013.01); *A63F 2300/105* (2013.01)

(58) Field of Classification Search
CPC ........................................................ G01P 21/00
See application file for complete search history.

(56) References Cited

U.S. PATENT DOCUMENTS

| | | | |
|---|---|---|---|
| 10,842,415 B1 * | 11/2020 | Jagannathan | .......... G16H 30/20 |
| 2005/0021270 A1 | 1/2005 | Hong | |
| 2008/0096654 A1 * | 4/2008 | Mondesir | .............. A63F 13/213 |
| | | | 463/31 |

(Continued)

FOREIGN PATENT DOCUMENTS

| | | | |
|---|---|---|---|
| JP | 2004239881 A | 8/2004 | |
| JP | 2010107244 A | 5/2010 | |

(Continued)

OTHER PUBLICATIONS

International Search Report and Written Opinion mailed Mar. 24, 2020, from PCT/JP2020/003173, 12 sheets.

*Primary Examiner* — Hyun D Park
(74) *Attorney, Agent, or Firm* — Fish & Richardson P.C.

(57) ABSTRACT

An information processing apparatus 1 sequentially receives a plurality of input data between predetermined time TS and time TE, and uses model information to estimate predetermined estimated data at a time point of time T (TS<T<TE) based on the received input data, the model information having been trained by machine learning so as to estimate the estimated data at the time point of the time T on the basis of the received input data.

20 Claims, 3 Drawing Sheets

(56) References Cited

U.S. PATENT DOCUMENTS

| | | | | |
|---|---|---|---|---|
| 2012/0154387 A1* | 6/2012 | Tsukahara | ............. | G06F 3/0346 345/419 |
| 2017/0127979 A1* | 5/2017 | Azaria | ................... | A61B 5/053 |
| 2017/0155828 A1* | 6/2017 | Irie | ....................... | H04N 23/63 |
| 2018/0361576 A1* | 12/2018 | Sakai | ..................... | B25J 9/1694 |
| 2019/0160664 A1* | 5/2019 | Nakagawa | ............. | B25J 9/1692 |
| 2019/0331832 A1 | 10/2019 | Chandra et al. | | |
| 2019/0383897 A1* | 12/2019 | Gullicksen | ........... | G02B 27/017 |

FOREIGN PATENT DOCUMENTS

| | | | |
|---|---|---|---|
| JP | 2017146279 A | 8/2017 |
| JP | 2017147825 A | 8/2017 |
| JP | 2018194441 A | 12/2018 |

* cited by examiner

INFORMATION PROCESSING APPARATUS, INFORMATION PROCESSING METHOD, AND PROGRAM

TECHNICAL FIELD

The present invention relates to an information processing apparatus, an information processing method, and a program.

BACKGROUND ART

In the past, the following method has been known as a method of calibrating a signal representing an angular velocity and acceleration output by an IMU (inertial measurement unit).

In one example of the method in the past, as an acceleration signal calibration method, there is a known method of calibrating a signal (bias error) output by an IMU, the maximum value of the measurement value estimated from the output signal, the difference from the maximum value of the actual measurement value (scale factor error), and, moreover, a non-orthogonal error when a device including the IMU is determined to be stationary.

Specifically, a vector (a three-dimensional vector including components in the respective X, Y, and Z axis directions) d representing the bias error, a diagonal matrix (3×3 matrix) S representing the scale factor error, and an upper triangular matrix $T_N$ representing the non-orthogonal error are used to correct a signal imu representing acceleration (a signal representing the vector value including components of the above-described respective three axes) output by the IMU to imu'=$T_N$S(imu+d). Then, the position and the like of the device are estimated by using the corrected acceleration value imu'.

SUMMARY

Technical Problems

However, with the calibration method of the above-described example in the past, an error due to the distortion of a sensor included in the IMU and an error due to the sensitivity difference depending on the orientation in which a force is received cannot be calibrated. Moreover, even if a signal is corrected as in the above-described example in the past, there are some errors that cannot be removed such as a white noise error. Therefore, it is not practical that the method is used for processing such as time integration over a long period of time.

Further, in the case where it is determined that the device is stationary when substantially the same signal is obtained from the IMU a predetermined number of times or more successively, there is a problem that the device is likely to be determined as being stationary in a situation in which the device is moving at a low speed. Further, when the device just starts to move, the device is likely to be determined as being stationary. In this case, information regarding the position of the device when the device becomes stationary next time results in an error.

As described above, the method in the past, of calibrating the output of the IMU has a problem that it is not easy to estimate the position of the device on the basis of the output of the IMU.

The present invention has been made in view of the above-described circumstances. One of objects of the present invention is to provide an information processing apparatus, an information processing method, and a program that can further reduce an error of a signal output by an IMU and also make the estimation of the position of a device including the IMU practical on the basis of the signal output by the IMU.

Solution to Problems

An information processing apparatus according to one aspect of the present invention includes means that sequentially receives a plurality of input data between predetermined time TS and time TE, and estimation means that uses model information to estimate predetermined estimated data at a time point of time T (TS<T<TE) based on the received input data, the model information having been trained by machine learning so as to estimate the estimated data at the time point of the time T on the basis of the received input data.

Further, an information processing apparatus according to one aspect of the present invention includes means that receives, from a device including an inertial measurement unit, an output of the inertial measurement unit, means that estimates posture information of the device on the basis of the output received from the inertial measurement unit, and estimation means that uses a first machine learning model to estimate at least a bias error included in information regarding movement acceleration output by the inertial measurement unit included in the device by inputting information based on the estimated posture information of the device into the first machine learning model, the first machine learning model using the information based on the estimated posture information as input data and being in a state of having learned, by machine learning, at least a relation between the input data and the bias error included in the information regarding the movement acceleration output by the inertial measurement unit, in which the estimated bias error is used for a process of calibration of the movement acceleration output by the inertial measurement unit.

Advantageous Effects of Invention

By applying the present invention to a signal output by an IMU included in a device, an error of the signal can be further reduced, and, moreover, the estimation of the position of the device including the IMU can be made practical on the basis of the signal output by the IMU.

DESCRIPTION OF EMBODIMENT

An embodiment of the present invention will be described with reference to the drawings. As exemplified in FIG. 1, an information processing apparatus 1 according to an embodiment of the present invention is communicably connected to a device 2 by wire or wirelessly. The device 2 is, for example, moved and operated by a user holding the device 2 in the user's hand.

Figure 1:
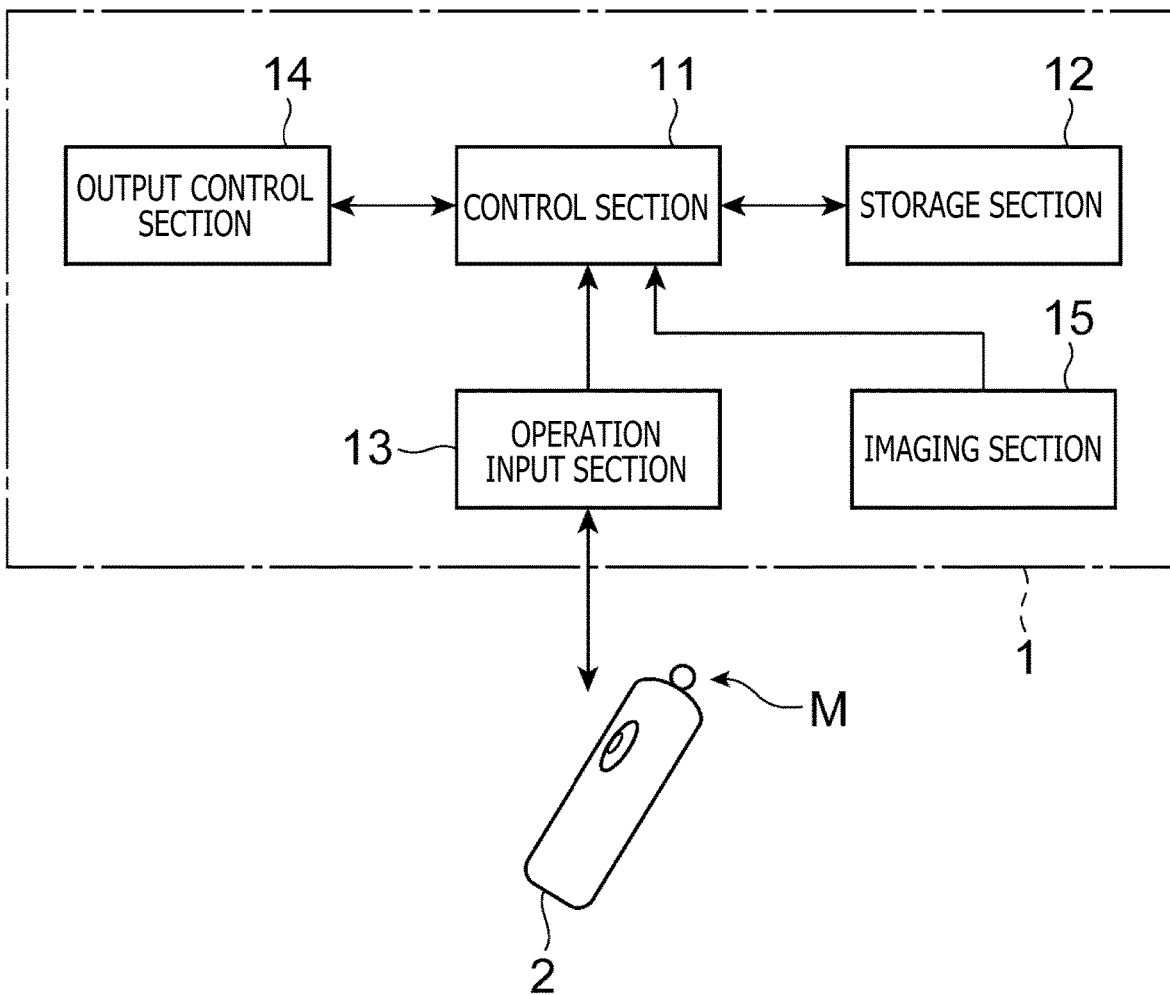
FIG. 1 is a configuration block diagram representing an example of an information processing apparatus according to an embodiment of the present invention.

Further, as illustrated in FIG. 1, the information processing apparatus 1 includes a control section 11, a storage section 12, an operation input section 13, an output control section 14, and an imaging section 15. In one example of the present embodiment, the information processing apparatus 1 may be a home-use game machine, and the device 2 may be a game controller of the game machine.

In the example of the present embodiment, the device 2 is a controller device held by the user in the user's hand when used. The device 2 may have, for example, a cylindrical housing, and a marker M such as an LED (light emitting diode) may be disposed on the housing. The information processing apparatus 1 may detect the marker M of the device 2 held by the user in the user's hand from an image captured by the imaging section 15 and acquire posture information such as the position and orientation of the device 2.

Figure 2:
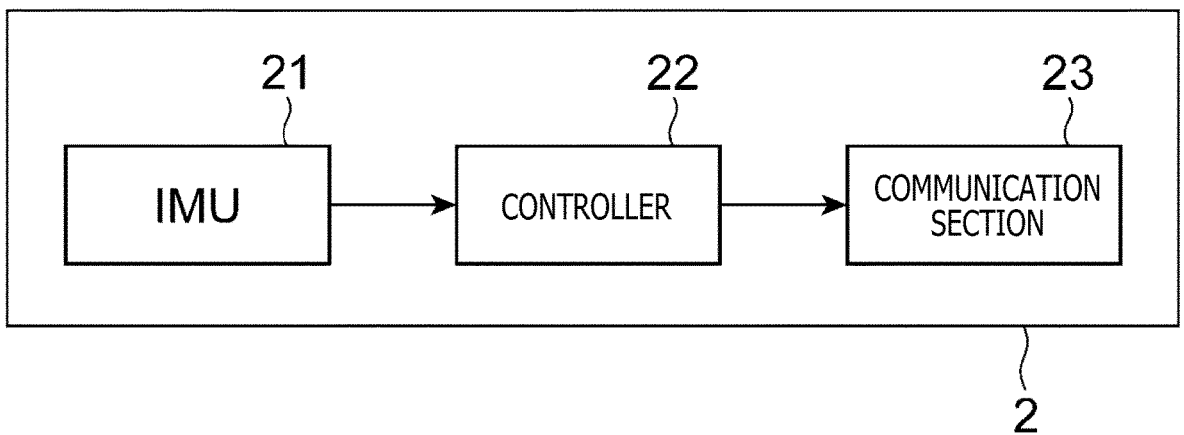
FIG. 2 is a configuration block diagram representing an example of a device connected to the information processing apparatus according to the embodiment of the present invention.

Further, as exemplified in FIG. 2, the device 2 includes an IMU 21, a controller 22, and a communication section 23. Here, the IMU 21 includes an acceleration sensor (three-axis acceleration sensor) and a gyro sensor. The acceleration sensor measures accelerations in three axis directions orthogonal to each other. Further, the IMU 21 may include a magnetic sensor to estimate the azimuth.

The controller 22 is a microprocessor or the like and operates according to a program stored in a built-in memory or the like. The controller 22 repeatedly obtains acceleration information a, which is a measured value of the acceleration sensor (a value representing the movement acceleration in each of the above-described three axis directions) output by the IMU 21, and an angular velocity value $\omega$, which is represented by the gyro sensor, at each predetermined timing (at each fixed time interval $\Delta t$ in the example here) and outputs the acceleration information a and the angular velocity value $\omega$ to the communication section 23.

The communication section 23 is communicably connected to the information processing apparatus 1 by wire or wirelessly and transmits a signal representing the acceleration information a and the angular velocity value $\omega$ output by the controller 22 to the information processing apparatus 1.

Further, the control section 11 of the information processing apparatus 1 includes a program control device such as a CPU and operates according to a program stored in the storage section 12. As processing of a game application, for example, the control section 11 performs processing of the game application on the basis of a movement operation or the like of the device 2 by the user.

Specifically, the control section 11 according to the present embodiment receives the input of the signal representing the acceleration information a and the angular velocity value $\omega$ from the device 2 and performs the next processing. The acceleration information a and the angular velocity value $\omega$ received here are both values in the coordinate system (sensor coordinate system) specific to the device 2. This coordinate system is, for example, the $\xi\eta\zeta$ orthogonal coordinate system in which the longitudinal direction of the device 2 having a cylindrical shape (the direction of the axis of rotational symmetry of the cylinder) is set as the $\zeta$ axis, the direction toward the user, in a plane orthogonal to the $\zeta$ axis, when the device 2 is held by the user, is, for example, set as the $\eta$ axis, and the direction orthogonal to the $\zeta$ and $\eta$ axes in the above-described plane is set as the $\xi$ axis.

The control section 11 first estimates the posture of the device 2 from the angular velocity value $\omega$. In the example of the present embodiment, the control section 11 applies a Madgwick filter (Madgwick Filter: Madgwick, An efficient orientation filter for inertial and inertial/magnetic sensor arrays, Technical Report, University of Bristol, UK., 2010) to the angular velocity value $\omega$ and obtains posture quaternion q on the basis of the result of the estimation of the posture output by the Madgwick filter. This posture quaternion q corresponds to the posture information of the present invention. Each component of the posture quaternion q obtained here includes a vector representing the direction of a rotation axis represented by the global coordinate system (e.g., the coordinate system that is not related to the posture of the device 2, for example, the XYZ orthogonal coordinate system in which the gravity direction is set as the Y axis, the user's front direction in the floor face orthogonal to the Y axis is set as the Z axis, and the axis direction orthogonal to the Z and Y axes in the above-described floor face is set as the X axis) and a rotation angle w around the rotation axis.

Further, the control section 11 uses a first neural network to estimate a vector value of a bias error of the corresponding acceleration and diagonal components of a matrix representing a scale factor error of the acceleration by inputting the posture quaternion q obtained from the angular velocity received from the device 2 into the first neural network. The first neural network is in the state of having been trained by machine learning so as to output estimated values of the vector value of the bias error of the acceleration and the diagonal components of the matrix representing the scale factor error of the acceleration by using the posture quaternion q as an input.

The control section 11 uses the vector value of the bias error and the matrix of the scale factor error (the matrix in which the estimated diagonal components are arranged in the corresponding elements) that have been estimated here to obtain error-removed acceleration information a' that is obtained by removing these errors from the acceleration information a received from the device 2.

The control section 11 converts the value of the acceleration into acceleration information ag in the global coordinate system by using the error-removed acceleration information a' and the posture quaternion q. Moreover, the control section 11 uses a second neural network (model information) to obtain an estimated value $\alpha$ of the true value of the acceleration, which is estimated data at a time point of time T (T=TS+$\Delta\tau$, and this $\Delta\tau$ is predetermined; Note that TS<T<TE), on the basis of the above-described input acceleration information ag. The second neural network uses the above-described acceleration information ag, which is sequentially obtained between predetermined time TS and time TE, as input data and is in the state of having been trained by machine learning so as to estimate and output the true value of the acceleration in the predetermined global coordinate system at the time point of the above-described time T on the basis of the input data.

The control section 11 uses the estimated value $\alpha$ of the acceleration at the time point of the time T and the acceleration information ag obtained until the time TE after the time T to obtain the velocity value and the position value in the global coordinate system. The details of the processing of the control section 11 will be described later.

The storage section 12 includes a disk device and a memory device and retains programs to be executed by the control section 11. The programs may be stored in a computer-readable and non-transitory recording medium and provided therefrom, and then stored in the storage section 12.

The operation input section 13 outputs a signal input from the device 2, which is a controller, to the control section 11. This signal includes a signal representing the above-described acceleration information a and the above-described angular velocity value ω.

The output control section 14 is connected to a display device such as a display and displays an image according to an instruction input from the control section 11. The imaging section 15 includes a camera or the like and captures an image in a predetermined direction and outputs the image to the control section 11. In the present embodiment, the imaging section 15 is disposed so as to capture an image in the direction in which the user is located.

Figure 3:
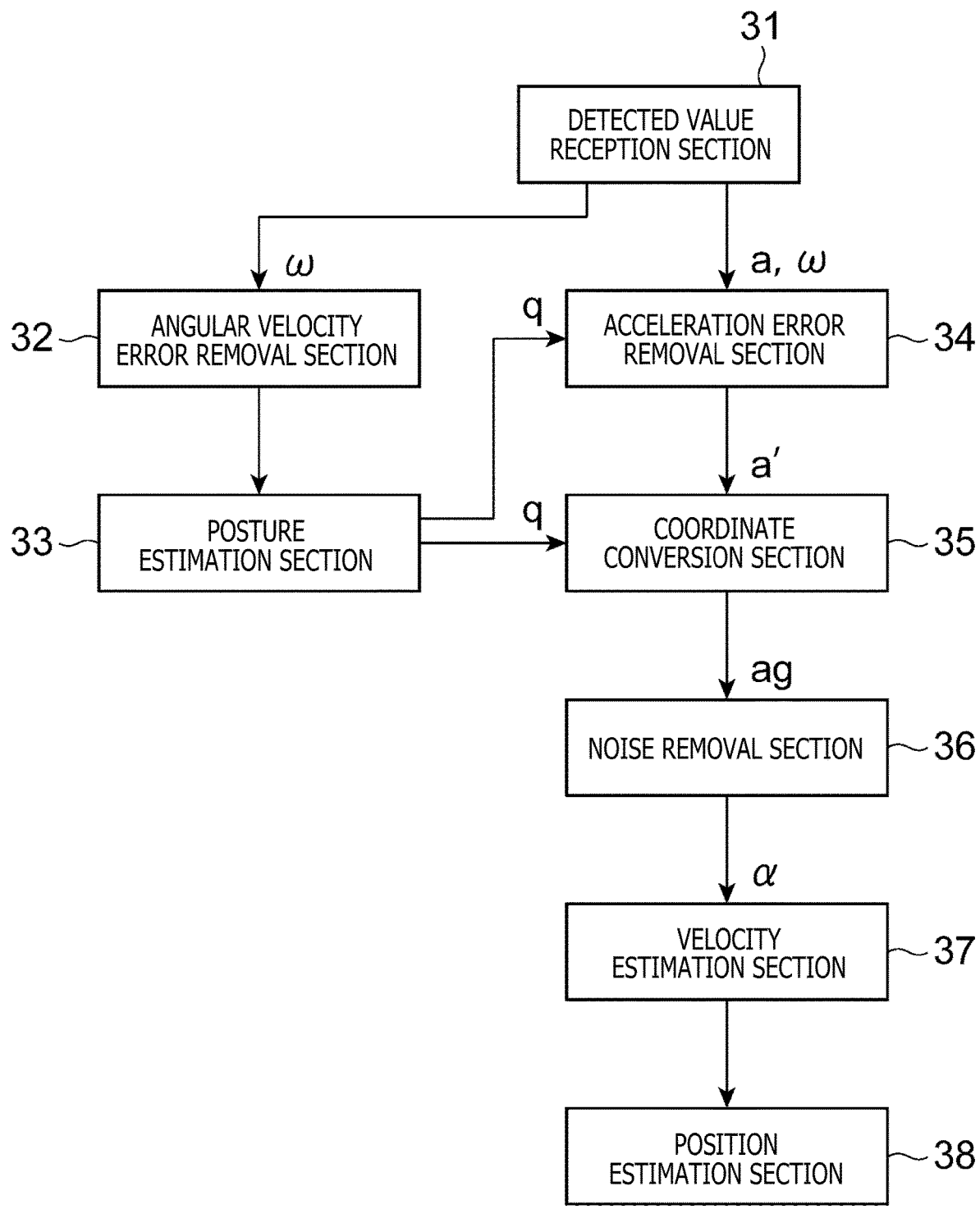
FIG. 3 is a functional block diagram representing an example of the information processing apparatus according to the embodiment of the present invention.

Next, the operation of the control section 11 according to the present embodiment will be described. The control section 11 according to the embodiment of the present invention executes a program stored in the storage section 12 to implement a functional configuration exemplified in FIG. 3.

The control section 11 functionally includes a detected value reception section 31, an angular velocity error removal section 32, a posture estimation section 33, an acceleration error removal section 34, a coordinate conversion section 35, a noise removal section 36, a velocity estimation section 37, and a position estimation section 38.

The detected value reception section 31 receives the input of the signal representing the acceleration information a and the angular velocity value ω from the device 2. The detected value reception section 31 outputs the received angular velocity value ω to the angular velocity error removal section 32. Further, the detected value reception section 31 outputs the received acceleration information a to the angular velocity error removal section 32, the posture estimation section 33, and the acceleration error removal section 34. Here, the angular velocity value ω includes angular velocity values with respect to the respective angular directions of the rotation angle (yaw angle) around the ξ axis, the rotation angle (pitch angle) around the η axis, and the rotation angle (roll angle) around the ζ axis.

The angular velocity error removal section 32 instructs the output control section 14 to display a screen instructing the user to temporarily stop at a predetermined timing (e.g., when the angular velocity value is first input). Then, when the angular velocity error removal section 32 determines that the user has stopped (e.g., when the norm (sum of squares) of each component of the angular velocity value output by the device 2 at each predetermined timing is determined to have fallen below a predetermined threshold value a predetermined number of times successively), the angular velocity error removal section 32 obtains the angular velocity value at this time point a plurality of times and obtains the average thereof as the angular velocity bias for each component of roll, pitch, and yaw. The angular velocity error removal section 32 retains the angular velocity biases obtained here in the storage section 12 or the like. After that, the angular velocity error removal section 32 instructs the output control section 14 to present a screen indicating the completion of the calibration to the user.

Further, after obtaining the angular velocity biases, the angular velocity error removal section 32 subtracts the value of the component of the corresponding angular velocity bias from the value of each component of the input angular velocity value ω and outputs an angular velocity value ω' after calibration.

The posture estimation section 33 removes a drift error from the angular velocity value ω' output by the angular velocity error removal section 32, estimates a vector in the gravity direction in the sensor coordinate system, and generates and outputs the posture quaternion q representing the posture of the device 2 in the global coordinate system.

Since the operation of the posture estimation section 33 can employ a widely known method using, for example, the Madgwick filter, detailed description is omitted here.

Figure 4:
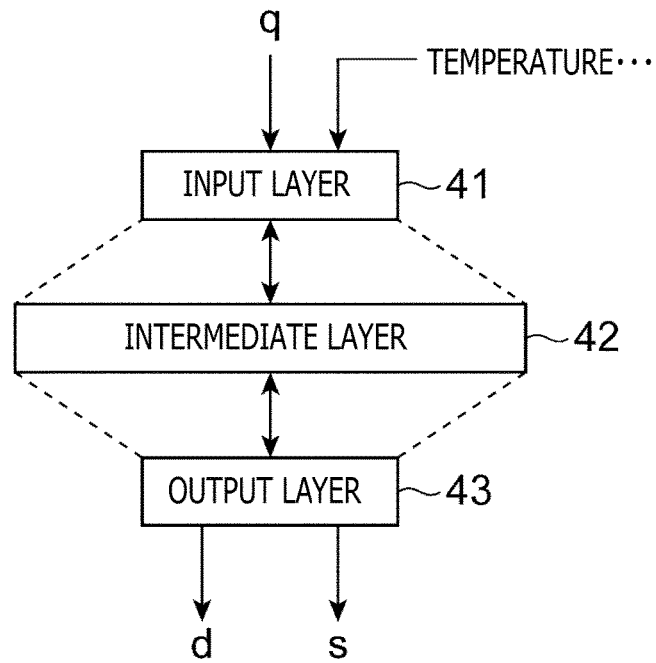
FIG. 4 is a block diagram representing an example of a configuration of a first neural network used by the information processing apparatus according to the embodiment of the present invention.

As exemplified in FIG. 4, the acceleration error removal section 34 uses the first neural network, which includes an input layer 41, an intermediate layer 42, and an output layer 43, to estimate an acceleration bias value d and an acceleration scale factor value s from the posture quaternion q.

In this first neural network, individual layers are connected to each other in the form of a fully connected network. The input layer 41 and the intermediate layer 42 employ known activation functions such as ReLU.

In the example of the present embodiment, learning parameters such as connection weights between the individual layers of the first neural network and bias information are generated for each device 2 prior to its shipment from the factory. For example, a non-volatile memory may be disposed in the device 2 and the learning parameters may be stored in, for example, this memory. In this case, when the device 2 is connected to the information processing apparatus 1, the learning parameters are transferred from the device 2 to the information processing apparatus 1, and the information processing apparatus 1 sets the connection weights between the individual layers of the first neural network by using the learning parameters and uses the first neural network. Alternatively, unique identification information may be assigned to each device 2, and learning parameters obtained by machine learning in advance for each device 2 identified by the corresponding identification information may be retained in association with the identification information in a server accessible via a network. In this case, when any of the devices 2 is connected to the information processing apparatus 1, the information processing apparatus 1 refers to the identification information of the device 2, acquires the learning parameters retained in the server in association with the identification information, and sets the connection weights between the individual layers of the first neural network.

Further, the learning parameters can be obtained as follows. The device 2 is connected to the information processing apparatus 1 according to the present embodiment, and the device 2 is kept stationary in a plurality of postures. Then, when the control section 1 of the information processing apparatus 1 determines that the device 2 is stationary, machine learning is performed so as to output the acceleration information a as the acceleration bias value d by using the posture quaternion q output by the above-described posture estimation section 33 as an input. Further, as for the acceleration scale factor value (diagonal components of the matrix representing the acceleration scale factor error) s, machine learning is performed such that the value of each component thereof becomes constant regardless of the value of the posture quaternion q.

This machine learning processing employs a widely known method such as backpropagation processing based on the difference between each value of the output of the output layer 43 of the first neural network when the posture quaternion q is input into the input layer 41 and the acceleration information a and the value s of each component of the matrix S representing the predetermined acceleration scale factor error that correspond to each value.

Further, although the input data input into the first neural network is assumed to be the posture quaternion q in the example here, the present embodiment is not limited thereto. The input data may further include the environmental temperature (the temperature measured by a temperature sensor, not illustrated, included in the device 2), the operating time of the device 2 (the elapsed time since the power is turned on), and humidity (humidity measured by a humidity sensor, not illustrated, included in the device 2).

Moreover, although the acceleration information a when the device 2 is stationary is used as teaching data here, the present embodiment is not limited thereto. The magnitude of vibration and changes in acceleration of the device 2 (temporal changes in the acceleration information a) while the device 2 is being moved by the user may be included in the input data together with the posture quaternion q.

It is noted that whether or not the device 2 is stationary can be determined by determining whether or not, for example,

- the norm (sum of squares) of each component of the angular velocity value output by the device 2 at each predetermined timing has fallen below the predetermined threshold value a predetermined number of times successively,
- the absolute value of the acceleration output by the device 2 at each predetermined timing has fallen below the predetermined threshold value a predetermined number of times successively, or
- the absolute value of the temporal subtraction of the acceleration output by the device 2 (the difference between two accelerations output by the device 2 at different timings) has fallen below the predetermined threshold value a predetermined number of times successively.

Further, the acceleration error removal section 34 of the control section 11 uses the acceleration bias value d and the acceleration scale factor value s estimated by using the first neural network to remove these errors from the acceleration information a. It is noted that each of the acceleration bias value d and the acceleration information a is a three-dimensional vector including the acceleration value in each component direction of the sensor coordinate system, while the acceleration scale factor value s represents each diagonal component of the diagonal matrix (3×3 matrix) S representing the scale factor error.

In the example of the present embodiment, the acceleration error removal section 34 obtains the error-removed acceleration information a' as follows.

$$a'=S(a+d)$$

or, $$a'=Sa+d$$

The coordinate conversion section 35 converts the error-removed acceleration information a' (the value in the sensor coordinate system) output by the acceleration error removal section 34 into the acceleration information ag in the global coordinate system by using the posture quaternion q output by the posture estimation section 33.

Figure 5:
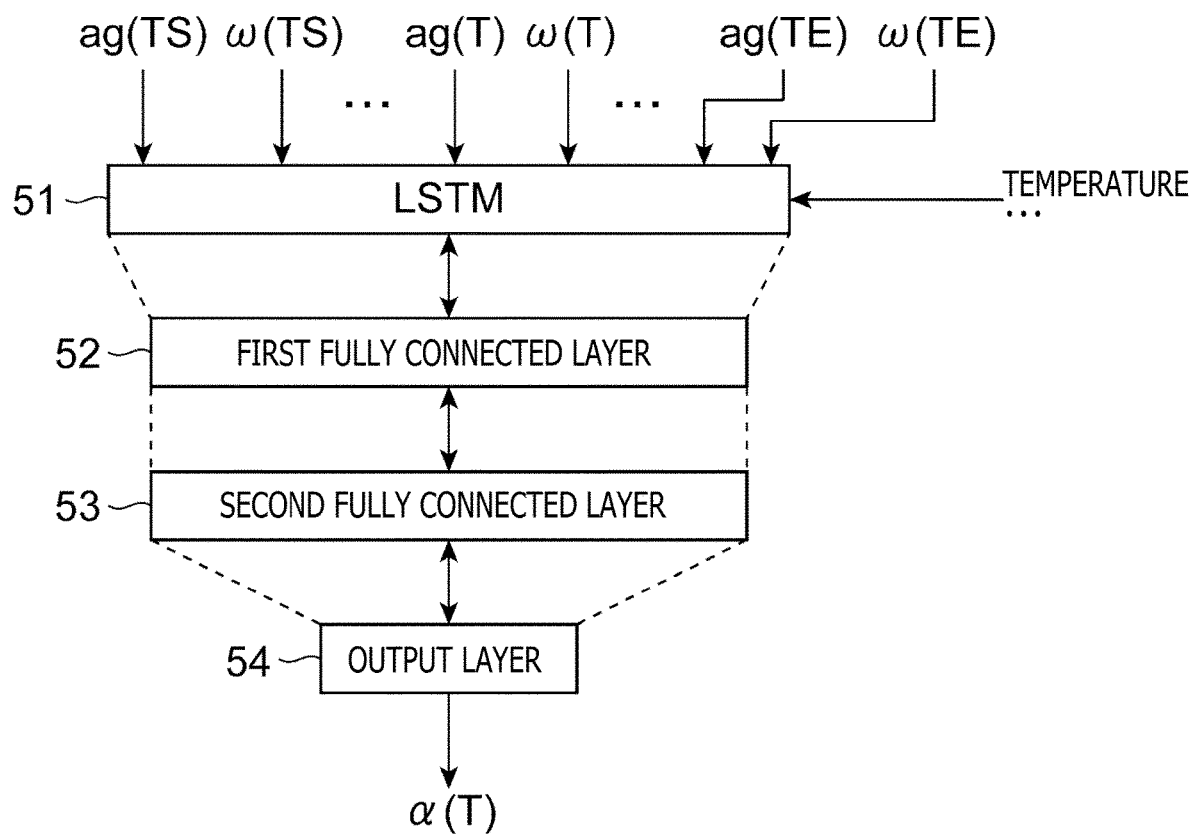
FIG. 5 is a block diagram representing an example of a configuration of a second neural network used by the information processing apparatus according to the embodiment of the present invention.

As exemplified in FIG. 5, the noise removal section 36 uses the second neural network, which includes an LSTM (Long Short Term Memory) layer 51, a first fully connected layer 52, a second fully connected layer 53, and an output layer 54, to estimate, by using a plurality of acceleration values in the global coordinate system input during a predetermined time period as the input data, the true value of the acceleration in the global coordinate system at a time point earlier than a time point when the acceleration value was last input.

Specifically, learning parameters such as connection weights between the individual layers of the second neural network and biases are set to predetermined values at least initially (at the time point of the installation of the programs to be executed by the control section 11). At least in the initial state, the learning parameters are generated by the manufacturer of the device 2.

As an example, the learning parameters of the second neural network can be obtained as follows. The information processing apparatus 1 according to the present embodiment causes the imaging section 15 to capture an image of the device 2 in a scene in which the user moves the device 2 held by the user in the user's hand, and obtains global position information p(t0), p(t1), . . . regarding the position of the device 2 n+1 times at time t0, t1, . . . , and tn from the captured image. Here, ti+1−ti is assumed to be a certain time period Δt. Further, the information processing apparatus 1 obtains the temporal subtraction of the position information obtained here: v(t1)=(p(t1)−p(t0))/Δt, v(t2)=(p(t2)−p(t1))/Δt, . . . . Moreover, the information processing apparatus 1 applies a low-pass filter to the temporal subtraction at each time point to obtain information regarding the movement velocity of the device 2. Moreover, the information processing apparatus 1 obtains L(t2)=(v(t2)−v(t1))/Δt, L(t3)=(v(t3)−v(t1))/(2Δt), . . . , which is the temporal subtraction from the initial velocity v(t1) of the movement velocity information (that is, the difference in velocity from the initial time point), and then applies a low-pass filter to the difference in velocity at each time point to obtain teaching data for the movement acceleration. It is noted that the teaching data for the movement acceleration may be further corrected so as to be consistent with the position information by accumulating the difference after the low-pass filter is applied. These processes can employ various methods widely known as processes for obtaining velocity and acceleration based on image data.

Meanwhile, the information processing apparatus 1 obtains acceleration information ag(t2), ag(t3), . . . ag(tn) in the global coordinate system at each time point output by the coordinate conversion section 35 by using the acceleration information a and the angular velocity value ω input by the device 2 at the time point of each of the times t2, t2 . . . tn.

Further, from the posture quaternion information q(t1), q(t2), . . . q(tn) output by the posture estimation section 33 at each time point, the information processing apparatus 1 obtains acceleration information ag' (t2), ag' (t3), . . . , ag' (tn) each excluding the gravitational component by subtracting the value corresponding to gravitational acceleration from the value of the Y-axis component (in the vertical downward direction in the global coordinate system) of each acceleration information ag(t2), ag(t3), . . . , ag(tn) in the global coordinate system at each of the above-described time points.

Moreover, the information processing apparatus 1 obtains the angular velocity that is the temporal subtraction of the posture quaternion at each time point:

$$\omega q(t2)=q(t2)-q(t1)$$

$$\omega q(t3)=q(t3)-q(t2)$$

The information processing apparatus 1 randomly initializes the learning parameters of the second neural network and obtains the output value of the output layer 54 when N pieces of acceleration information ag (acceleration information ag input over a time period of N·Δt, where N is a natural number of 2 or greater) from ag(t2) to ag(t2+N·Δt) and N angular velocities ωq(t2), ωq(t3), . . . ωq(t2+N·Δt) are input into the LSTM layer 51 as input data. On the basis of the difference between teaching data L(t2+M·Δt)=v(t2+M·Δt)−v(t1) at time t2+M·Δt (natural number where 0<M<N holds) and this output value, the information processing apparatus 1 updates the learning parameters of the second neural network such that the output value of the second neural network when the pieces of acceleration information ag' (t2) to ag' (t2+N·Δt), which exclude the gravitational acceleration, and the angular velocities ωq(t2), ωq(t3), . . . ωq(t2+N·Δt) are input matches teaching data L(t2+M·Δt). This update processing can be performed by widely known processing such as backpropagation.

The information processing apparatus 1 performs this machine learning processing using a large number of pairs of input data and teaching data. Then, the second neural network is in the state of having been trained by machine learning so as to estimate and output the true value of the acceleration in the predetermined global coordinate system at the time point of the time T (T=TS+Δτ, and this Δτ is predetermined; Note that TS<T<TE) on the basis of the input data. The input data include N pieces of acceleration information ag', each of which excludes the gravitational acceleration, and angular velocities ω, which are sequentially obtained between the certain time TS and time TE (where TE=TS+Δt×N).

The noise removal section 36 of the control section 11 inputs, as input data, N pieces of acceleration information ag', each of which excludes the gravitational acceleration, and temporal changes in the posture quaternion q (corresponding to the angular velocity in the global coordinate system), which are sequentially obtained between the latest time TS and time TE, into the LSTM (Long Short Term Memory) layer 51 of the second neural network in the state of having been trained by machine learning as exemplified as above. The temporal changes in the posture quaternion q are as follows:

$$\omega q(tS+\Delta t)=q(tS+\Delta t)-q(ts)$$

$$\omega q(tS+2\Delta t)=q(tS+2\Delta t)-q(ts+\Delta t)$$

$$\omega q(tS+N\Delta t)=q(tS+N\Delta t)-q(ts+(N-1)\times\Delta t)$$

The noise removal section 36 obtains the estimated value α of the true value of the acceleration in the predetermined global coordinate system at the time point of the time T (T=TS+Δτ, and this Δτ is predetermined; Note that TS<T<TE) output by the second neural network on the basis of the input data.

The velocity estimation section 37 stores the velocity value at the time point of the time TS obtained by the velocity estimation section 37 previous time (initially, each component in the global coordinate system is reset to "0") and then estimates the velocity value V(T) at the time T by adding the estimated value α of the movement acceleration between the time TS and the time T to this velocity value.

With respect to the velocity V(T) estimated here, moreover, the velocity estimation section 37 uses the acceleration information ag' (T+Δt), ag' (T+2Δt), . . . , ag' (TE) obtained by removing the gravitational acceleration from the output of the coordinate conversion section 35 at each time point until T<t≤TE, where time t is later than the time T, to obtain each of:
- the estimated value V(T+Δt) of the velocity at time T+Δt from V(T)+ag' (T+ΔT),
- the estimated value V(T+2Δt) of the velocity at time (T+2Δt) by adding V(T+Δt)+ag' (T+2Δt), that is, the accumulation (integration) of the output (excluding the gravitational acceleration) ag' of the coordinate conversion section 35 between the time T and the time T+2Δt to V(T), and
- the estimated value V(TE) of the velocity at time TE by adding V(TE−Δt)+ag' (TE), that is, the accumulation (integration) of the output (excluding the gravitational acceleration) ag' of the coordinate conversion section 35 between the time T and the time T+TE to V(T).

The velocity estimation section 37 outputs the estimated value at each of these time points. Further, the velocity estimation section 37 stores the estimated value V(T) of the velocity at the time T for the next computation. This time T becomes the time TS in the next computation.

The position estimation section 38 stores the position value P(TS) at the time point of the time TS obtained by the position estimation section 38 previous time (initially, each component in the global coordinate system is reset to "0"). Then, the position estimation section 38 obtains the position P(T) at the time T by adding the estimated value V(T) of the velocity at the time T to the stored position value. Further, the position estimation section 38 obtains V(T+Δt)+V(T+2Δt)+ . . . +V(TE−Δt)+V(TE) by accumulating (integrating) the estimated value (integration result) of the velocity until the time TE after the time T, and adds it to the position P(T), thereby estimating the position P(TE) at the time TE.

The position estimation section 38 outputs the position P(TE) at the time TE and uses it for predetermined processing of a game application or the like. Further, the position estimation section 38 stores the estimated value P(T) of the position at the time T for the next computation. As already described, this time T becomes the time TS in the next computation.

[Operation]

The present embodiment has the above-described configuration and operates as described in the following example. It is noted that in the following description, the information processing apparatus 1 retains the first neural network, which is an example of a first machine learning model, and the second neural network, which is an example of a second machine learning model, each of which is in the state of having been trained by machine learning in advance.

That is, the learning parameters such as the connection weights between the layers of the first neural network and the biases are generated for each device 2 prior to its shipment from the factory. In the example of the present embodiment, the learning parameters of the first neural network are obtained by performing machine learning by using, as input data, the posture quaternion q and the output of the temperature sensor included in the device 2 when the device 2 is stationary in each of a plurality of postures, so as to, when in the state of this input data, output the acceleration information a output by the inertial measurement unit included in the device 2 as the acceleration bias value d and also output the acceleration scale factor value s that depends exclusively on the output of the temperature sensor among the input data.

Further, in the example of the present embodiment, the learning parameters such as the connection weights between the layers of the second neural network and the biases are obtained by using information regarding the actual movement acceleration of the device 2 (it suffices that an image including the device 2 is captured and the information regarding the actual movement acceleration of the device 2 is obtained on the basis of the image) and information regarding the angular velocity and the movement acceleration output by the inertial measurement unit included in the device 2, which have been obtained while the posture and the movement acceleration of the device 2 are changed.

In this example, a computer device (the information processing apparatus 1 or the like) that trains the second neural network by machine learning retains information regarding the angular velocity (angular velocity in the sensor coordinate system) and the movement acceleration (acceleration information in the sensor coordinate system) which have been obtained while the posture and the movement acceleration of the device 2 are changed and which have been output by the inertial measurement unit included in the device 2 at a plurality of time points.

Then, this computer device obtains the temporal subtraction (angular velocity in the global coordinate system) of the posture quaternion at each of the above-described time points on the basis of the information regarding the angular velocity at each of the above-described time points. Further, this computer device obtains information regarding the movement acceleration (acceleration in the global coordinate system) at each of the above-described time points by removing errors of the acceleration bias and the acceleration scale factor from the information regarding the movement acceleration at each of the above-described time points, moreover, converting the resulting value into the value in the global coordinate system, and subtracting the gravitational component therefrom.

The computer device that trains the second neural network by machine learning trains the second neural network by machine learning so as to, when the angular velocity and the acceleration (excluding the gravitational component) in the global coordinate system at each of the time points of N times between a certain time range between TS and TE are used as input data, output information regarding the actual movement acceleration of the device 2 (this movement acceleration does not include the gravitational acceleration) obtained at the time T (TS<T<TE) within this time range.

The information processing apparatus 1 retains the pieces of information of the first and second neural networks in the state of having been trained by machine learning in this way. Then, the information processing apparatus 1 repeatedly receives, from the device 2 connected by wire or wirelessly, the input of a signal representing the acceleration information a and the angular velocity value ω of the inertial measurement unit included in the device 2 at each certain timing. Further, the information processing apparatus 1 receives, from the device 2, the input of the temperature information output by the temperature sensor included in the device 2 together with the information such as the angular velocity output by the inertial measurement unit.

When the information processing apparatus 1 determines that the user holding the device 2 is stationary (the device 2 is stationary), the information processing apparatus 1 obtains the angular velocity value at that time point a plurality of times and obtains and retains the average of these values for each component of roll, pitch, and yaw as the angular velocity bias.

Each time the angular velocity value ω is input, the information processing apparatus 1 subtracts the value of the corresponding component of the retained angular velocity bias from the value of each component of the input angular velocity ω to obtain the angular velocity value ω' after calibration. In addition, the information processing apparatus 1 uses, for example, the Madgwick filter on the basis of the angular velocity value ω' obtained here to estimate the vector in the gravity direction in the sensor coordinate system and generate the posture quaternion q representing the posture of the device 2 in the global coordinate system at each time point when the angular velocity value is input.

Further, the information processing apparatus 1 uses the first neural network to estimate the acceleration bias value d and the acceleration scale factor value at each of the above-described time points from the posture quaternion q obtained above and the temperature information received from the device 2.

Then, the information processing apparatus 1 obtains the acceleration information a' at each time point, whose error is removed from the acceleration information a received from the device 2 at each time point, as $a'=S(a+d)$ by using the acceleration bias value d at each of these time points and the matrix S in which the estimated value s of the acceleration scale factor at each of these time points is arranged.

The information processing apparatus 1 converts the error-removed acceleration information a' (value in the sensor coordinate system) into the acceleration information ag in the global coordinate system by using the posture quaternion q obtained earlier.

Then, the information processing apparatus 1 uses the second neural network to estimate the true value of the acceleration in the global coordinate system at the time point T earlier than the time point TE at which the acceleration value was input last time (that is, the time T, where TS<T<TE holds) by using, as input data, a plurality of acceleration values in the global coordinate system and a plurality of temporal subtractions (angular velocity values in the global coordinate system) of the above-described posture quaternions input during the time period between the time TS and the time TE. In this way, the information processing apparatus 1 obtains the estimated value α.

Further, the information processing apparatus 1 stores the previously obtained velocity value at the time point of the time TS. The information processing apparatus 1 adds the estimated value α of the movement acceleration between the time TS and the time T to this velocity value to estimate the velocity value V(T) at the time T.

In addition, the information processing apparatus 1 adds the acceleration information a' at each time point to V(T) to obtain the velocity value at each time point (each time point at which acceleration information was obtained) between the time T and the time TE. Moreover, the information processing apparatus 1 accumulates this information to obtain the position information at the time TE. Then, the information processing apparatus 1 uses this position information for predetermined processing of a game application or the like.

[Gravitational Component]

It is noted that although, in the description so far, the acceleration information used as the input data of the second neural network uses the acceleration information with the gravitational component removed therefrom, the present embodiment is not limited thereto. The acceleration information with the gravitational component left unremoved therefrom (in the state in which the gravitational acceleration 1G fixed to the axis in the gravity direction, in this example here, the Y axis, is added) may be used as the input data.

[Runtime Learning]

Further, in the present embodiment, the first and second neural networks may perform machine learning at runtime while the information processing apparatus 1 is being used, that is, while an application is being executed on the information processing apparatus 1.

As an example, the information processing apparatus 1 determines that the device 2 is stationary when the norm (sum of squares) of each component of the angular velocity value ω output by the device 2 at each predetermined timing has fallen below the predetermined threshold value a predetermined number of times successively. Then, when the information processing apparatus 1 determines that the device 2 is stationary, the information processing apparatus 1 inputs the posture quaternion q and the output of the temperature sensor included in the device 2 into the first neural network as the input data. Further, the information processing apparatus 1 retains the acceleration information a output by the device 2 at this time.

The information processing apparatus 1 obtains the acceleration bias value d and the acceleration scale factor value s, which are the output of the first neural network. The information processing apparatus 1, then, obtains the difference d−a by using the above-described retained acceleration information a as the teaching data of the acceleration bias value d. Further, the information processing apparatus 1 obtains the difference between the teaching data of the acceleration scale factor value predetermined as the value that depends on the output of the temperature sensor and the acceleration scale factor value s obtained as the output of the first neural network.

Then, the learning parameters (information such as connection weights between layers and biases) of the first neural network are updated by backpropagation processing such that these differences become "0."

Further, when the device 2 is within the angle of view of the image captured by the imaging section 15, the information processing apparatus 1 retains information regarding the angular velocity and the movement acceleration output by the inertial measurement unit included in the device 2 at each of a plurality of time points and also obtains information regarding at least any of the actual position, velocity, and movement acceleration of the device 2 at that time point on the basis of the image data captured by the imaging section 15.

Specifically, the information such as the movement acceleration of the device 2 is obtained by using tracking means (other tracking means) other than the method using the inertial measurement unit. Here, the information processing apparatus 1 operating as the other tracking means detects, for example, the position of the marker included in the device 2 from the image captured by the imaging section 15. Then, the information processing apparatus 1 obtains the temporal subtraction (velocity) of the detected position and further obtains the information regarding the movement acceleration by obtaining the temporal subtraction of the velocity. Further, in the case where the information processing apparatus 1 operating as the other tracking means can directly detect the velocity of the device 2 by using a certain method other than using the inertial measurement unit, it suffices that the information processing apparatus 1 obtains the information regarding the movement acceleration by obtaining the temporal subtraction of the velocity. Similarly, in the case where the information processing apparatus 1 can directly detect the movement acceleration of the device 2 by using a certain method other than using the inertial measurement unit, the information regarding the detected movement acceleration may be used as it is.

In this example, the information processing apparatus 1 obtains the temporal subtraction (angular velocity in the global coordinate system) of the posture quaternion q (output of the posture estimation section 33 of the control section 11) at each corresponding time point on the basis of the information regarding the angular velocity retained at each of the above-described time point.

Further, the information processing apparatus 1 removes errors of the acceleration bias and the acceleration scale factor from the acceleration information a at each of the above-described time points, moreover, converts the resulting value into a value in the global coordinate system, and subtracts the gravitational component therefrom. Specifically, the gravitational component is subtracted from the output of the coordinate conversion section 35 of the control section 11. Accordingly, the information processing apparatus 1 obtains the information regarding the movement acceleration (acceleration in the global coordinate system) at each of the above-described time points.

Then, the information processing apparatus 1 obtains the difference between the output of the second neural network when the angular velocity and the acceleration (excluding the gravitational component) in the global coordinate system at each of the time points of N times between the certain time range TS and TE among the above-described time points are used as the input data and the information regarding the actual movement acceleration of the device 2 (this movement acceleration does not include the gravitational acceleration) obtained at the time T within the certain time range ($T=TS+\Delta\tau$, and this $\Delta\tau$ is predetermined; Note that TS<T<TE), and trains the second neural network by machine learning such that the difference becomes "0."

Through machine learning performed at runtime in this way, the output can be adjusted so as to correspond to the aging deterioration of the device 2 and environmental changes such as the temperature in the usage scene.

[Machine Learning Excluding Rotation Around Gravity Direction]

Further, in one example of the present embodiment, the posture quaternion q input at the time of training the first neural network by machine learning or at the time of using the first neural network may be the one excluding a rotation component around the gravity axis (Y axis) (that is, the roll angle in the global coordinate system). Specifically, the information processing apparatus 1 obtains posture quaternion q' in which the roll angle component of the posture quaternion q to be input into the first neural network is set to a predetermined angle (e.g., 0 degree). Then, the information processing apparatus 1 uses the posture quaternion q' obtained here as the posture quaternion to be actually input into the first neural network.

In this way, the degree of freedom is reduced by the roll angle component. Accordingly, the variation of the training data to be used for machine learning can be reduced and it is expected that the machine learning result can converge relatively quickly. Moreover, the stability can be improved. Further, since the roll angle component in the global coordinate system does not substantially affect the bias error and the like, the impact on the accuracy of the estimated bias error is minor.

Further, the roll angle component is set to a predetermined angle here. Alternatively, the posture quaternion q may be converted into information regarding the rotation angles (yaw angle, roll angle, pitch angle) around respective axes in the XYZ coordinates, which may be then used as the posture information and used as the input data of the first neural network. In this case, the information regarding the roll angle may be discarded and the information regarding the yaw angle and pitch angle may be used as the input data of the first neural network.

By using the information regarding the yaw angle and pitch angle as the input data of the first neural network in this way, the degree of freedom is reduced by the roll angle component. Accordingly, the variation of the training data to be used for machine learning can be reduced and it is expected that the machine learning result can converge relatively quickly. Moreover, the stability can be improved. Further, since the roll angle component in the global coordinate system does not substantially affect the bias error and the like, the impact on the accuracy of the estimated bias error is minor.

With this example, the machine learning result can converge quickly and the stability can be improved. Therefore, it is suitable when machine learning is performed at runtime.

[Data Loss]

Further, in the case where the device 2 is wirelessly communicating with the information processing apparatus 1, it is expected that the information processing apparatus 1 fails to receive acceleration information or angular velocity information output by the device 2 (the case where data loss occurs).

In order to deal with such a situation, when the second neural network is trained by machine learning, the training data may be randomly missed (for example, the value of a corresponding component is set to "0"), and the second neural network may be trained so as to learn the data loss state.

In this example, when loss of information regarding the acceleration or the like to be input as the input data occurs while the second neural network is actually being used (while the true value of the acceleration is being estimated using the second neural network that has been trained by machine learning), the value corresponding to the lost information is set to "0" and used as the input data.

Alternatively, the second neural network may be trained by machine learning by using input data including a flag indicating the occurrence of the loss (the flag is set to "1" when the loss has occurred). At the time of actual use, when there is no loss, the input data may be input with the loss flag set to "0," and when the loss has occurred, the input data may be input with the loss flag set to "1."

[Application to Angular Velocity]

Further, although the first neural network is used only for calibration of the acceleration information in the description so far, the first neural network may also be used for calibration of the angular velocity. In this example, when it is determined that the device 2 is stationary, all the components of the angular velocity should be "0." Therefore, it suffices that the first neural network learns, by machine learning, the angular velocity value at the stationary state, together with the acceleration information for each device 2 and corrects them.

[Modifications]

Although the information processing apparatus 1 and the device 2 are separate entities in the example described above, they may be integrally configured in one example of the present embodiment. Specifically, the information processing apparatus 1 and the device 2 according to the present embodiment may be implemented as an integrated device such as a smartphone.

REFERENCE SIGNS LIST

1: Information processing apparatus
2: Device
11: Control section
12: Storage section
13: Operation input section
14: Output control section
15: Imaging section
21: IMU
22: Controller
23: Communication section
31: Detected value reception section
32: Angular velocity error removal section
33: Posture estimation section
34: Acceleration error removal section
35: Coordinate conversion section
36: Noise removal section
37: Velocity estimation section
38: Position estimation section
41: Input layer
42: Intermediate layer
43: Output layer
52: First fully connected layer
53: Second fully connected layer
54: Output layer

The invention claimed is:

1. A system comprising:
a game controller device;
an inertial measurement unit included in the game controller device; and
an information processing apparatus comprising processing circuitry configured to perform operations comprising:
sequentially receiving a plurality of input data generated between predetermined time TS and time TE, the plurality of input data comprising acceleration information output by the inertial measurement unit;
estimating posture information of the game controller device as a posture quaternion based on the received plurality of input data, wherein each component of the posture quaternion includes a vector representing a direction of a rotation axis represented by a predetermined global coordinate system different from a posture of the game controller device;
using a first machine learning model to estimate at least a bias error and a scale factor error included in the acceleration information by inputting the posture quaternion into the first machine learning model, the first machine learning model using the posture quaternion as input data and being in a state of having learned, by machine learning, at least a relation among the posture quaternion, the scale factor error, and the bias error;
generating calibrated acceleration information using the estimated bias error and scale factor error;
receiving a sequence of the calibrated acceleration information representing acceleration occurring between the predetermined time TS and time TE;
using a second machine learning model to estimate a true value of acceleration at a time point T (TS<T<TE) by inputting the sequence of calibrated acceleration information into the second machine learning model;

determining a velocity value at the time point T based on the estimated true value of acceleration;

integrating the velocity value with subsequent acceleration information obtained between the time point T and the time TE to determine a position of the game controller device at the time TE; and controlling operations of a game application based on the determined position of the game controller device.

2. The system of claim 1, wherein the input data include measurement data related to the acceleration of the game controller device, and information related to at least one of velocity or position of the game controller device is generated by accumulating the input data input at time later than the time T to the estimated true value of acceleration.

3. A system comprising:

a game controller device;

an inertial measurement unit included in the game controller device; and an information processing apparatus comprising processing circuitry configured to perform operations comprising:

receiving, from the game controller device, an output of the inertial measurement unit;

estimating posture information of the game controller device as a posture quaternion on a basis of the output received from the inertial measurement unit, wherein each component of the posture quaternion includes a vector representing a direction of a rotation axis represented by a global coordinate system different from a posture of the game controller device;

using a first machine learning model to estimate at least a bias error and a scale factor error included in information regarding acceleration output by the inertial measurement unit included in the game controller device by inputting the posture quaternion into the first machine learning model, the first machine learning model using the posture quaternion as input data and being in a state of having learned, by machine learning, at least a relation between the input data, the scale factor error, and the bias error included in the information regarding the acceleration output by the inertial measurement unit;

generating calibrated acceleration information using the estimated bias error and scale factor error for a process of calibration of the acceleration output by the inertial measurement unit;

receiving a sequence of the calibrated acceleration information between a first time point and a second time point;

using a second machine learning model to estimate a true acceleration value at a third time point between the first time point and the second time point by inputting the sequence of calibrated acceleration information into the second machine learning model;

determining a velocity value at the third time point based on the estimated true acceleration value;

integrating the velocity value with subsequent acceleration information obtained between the third time point and the second time point to determine a position of the game controller device at the second time point; and controlling operations of a game application based on the determined position of the game controller device.

4. The system of claim 3, wherein the first machine learning model is in a state of having learned, by machine learning, a relation between the input data and the bias error and an acceleration scale factor value included in the information regarding the acceleration output by the inertial measurement unit, wherein the processing circuitry is further configured to estimate the bias error and the acceleration scale factor value included in the information regarding the acceleration output by the inertial measurement unit included in the game controller device by inputting the input data based on the estimated posture information of the game controller device into the first machine learning model, and wherein the bias error and the acceleration scale factor value that have been estimated are used for the process of the calibration of the acceleration output by the inertial measurement unit.

5. The system of claim 3, wherein the operations further comprise:

sequentially receiving information regarding the acceleration of the game controller device at a plurality of time points between predetermined time TS and time TE, the acceleration having been subjected to the process of the calibration; and using second machine learning model information to estimate a true value of acceleration of the game controller device at a time point of time T (TS<T<TE) based on the received information regarding the acceleration, the second machine learning model information having been trained by machine learning so as to estimate the true value of the acceleration of the game controller device at the time point of the time T using the received information regarding the acceleration as input data, wherein information related to at least one of velocity or position of the game controller device is generated by accumulating the information regarding the acceleration input at time later than the time T to the estimated true value of acceleration.

6. The system of claim 5, wherein the processing circuitry is further configured to obtain information regarding any of position, velocity, and acceleration of the game controller device on a basis of information different from the information output by the inertial measurement unit, wherein the information regarding the acceleration of the game controller device that has been subjected to the process of the calibration and that has been received at the plurality of time points between the predetermined time TS and time TE and the information regarding any of the position, the velocity, and the acceleration obtained at the time point of the time T (TS<T<TE) are used to train the second machine learning model by machine learning.

7. The system of claim 5, wherein the second machine learning model is in a state of having been trained by machine learning using randomly missed input data so as to estimate the true value of the acceleration of the game controller device at the time point of the time T (TS<T<TE) when the input data are input.

8. The system of claim 3, wherein the processing circuitry is further configured to determine whether or not the game controller device is stationary, wherein when the game controller device is determined to be stationary, the first machine learning model is trained by machine learning in which the information regarding the acceleration output by the inertial measurement unit is the bias error to be output and the information based on the estimated posture information is used as the input data.

9. The system of claim 3, wherein using the calibrated acceleration information to estimate the true acceleration value reduces effects of at least one of the bias error or the scale factor error in the determination of the position of the game controller device at the second time point.

10. The system of claim 9, wherein reducing the effects of the at least one of the bias error or the scale factor error in the determination of the position of the game controller device improves accuracy of controlling the operations of the game application based on the determined position of the game controller device.

11. A system comprising:
a game controller device;
an inertial measurement unit included in the game controller device; and
an information processing apparatus comprising processing circuitry configured to perform operations comprising:
receiving, from the game controller device, an output of the inertial measurement unit;
estimating posture information of the game controller device on a basis of the output received from the inertial measurement unit, wherein the posture information is represented by a global coordinate system different from a posture of the game controller device;
using a first machine learning model to estimate at least a bias error and a scale factor error included in information regarding acceleration output by the inertial measurement unit included in the game controller device by inputting, out of the estimated posture information of the game controller device, information obtained by setting a rotation angle in a gravity direction to a predetermined angle into the first machine learning model, the first machine learning model using, out of the estimated posture information, posture information in which the rotation angle in the gravity direction is set to the predetermined angle as input data and being in a state of having learned, by machine learning, at least a relation between the input data and the bias error included in the information regarding the acceleration output by the inertial measurement unit;
using the estimated bias error and scale factor error for a process of calibration of the movement acceleration output by the inertial measurement unit to generate calibrated acceleration information;
receiving a sequence of the calibrated acceleration information between a first time point and a second time point;
using a second machine learning model to estimate a true acceleration value at a third time point between the first time point and the second time point by inputting the sequence of calibrated acceleration information into the second machine learning model;
determining a velocity value at the third time point based on the estimated true acceleration value;
integrating the velocity value with subsequent acceleration information obtained between the third time point and the second time point to determine a position of the game controller device at the second time point; and
controlling operations of a game application based on the determined position of the game controller device.

12. The system of claim 11, wherein using the calibrated acceleration information to estimate the true acceleration value reduces effects of at least one of the bias error or the scale factor error in the determination of the position of the game controller device at the second time point.

13. The system of claim 12, wherein reducing the effects of the at least one of the bias error or the scale factor error in the determination of the position of the game controller device improves accuracy of controlling the operations of the game application based on the determined position of the game controller device.

14. A system comprising:
a game controller device;
an inertial measurement unit included in the game controller device; and
an information processing apparatus comprising processing circuitry configured to perform operations comprising:
receiving, from a device including an inertial measurement unit, an output of the inertial measurement unit;
estimating posture information of the game controller device on a basis of the output received from the inertial measurement unit, wherein the posture information is represented by a global coordinate system different from a posture of the game controller device;
using a first machine learning model to estimate at least a bias error and a scale factor error included in information regarding acceleration output by the inertial measurement unit included in the game controller device by inputting, out of the estimated posture information of the game controller device, information excluding a rotation angle in a gravity direction into the first machine learning model, the first machine learning model using, out of the estimated posture information, the information excluding the rotation angle in the gravity direction as input data and being in a state of having learned, by machine learning, at least a relation between the input data and the bias error included in the information regarding the acceleration output by the inertial measurement unit;
using the estimated bias error and scale factor error for a process of calibration of the acceleration output by the inertial measurement unit to generate calibrated acceleration information;
receiving a sequence of the calibrated acceleration information between a first time point and a second time point;
using a second machine learning model to estimate a true acceleration value at a third time point between the first time point and the second time point by inputting the sequence of calibrated acceleration information into the second machine learning model;
determining a velocity value at the third time point based on the estimated true acceleration value;
integrating the velocity value with subsequent acceleration information obtained between the third time point and the second time point to determine a position of the game controller device at the second time point; and controlling operations of a game application based on the determined position of the game controller device.

15. A computer-implemented method comprising:
receiving, from a game controller device including an inertial measurement unit, an output of the inertial measurement unit;
estimating posture information of the game controller device as a posture quaternion on a basis of the output received from the inertial measurement unit, wherein each component of the posture quaternion includes a vector representing a direction of a rotation axis represented by a global coordinate system different from a posture of the game controller device;
using a first machine learning model to estimate at least a bias error and a scale factor error included in information regarding acceleration output by the inertial measurement unit included in the game controller device by inputting the posture quaternion into the first machine learning model, the first machine learning model using the posture quaternion as input data and being in a state of having learned, by machine learning, at least a relation between the input data, the scale factor error, and the bias error included in the information regarding the acceleration output by the inertial measurement unit;
using the estimated bias error and scale factor error for a process of calibration of the acceleration output by the inertial measurement unit to generate calibrated acceleration information;
receiving a sequence of the calibrated acceleration information between a first time point and a second time point;
using a second machine learning model to estimate a true acceleration value at a third time point between the first time point and the second time point by inputting the sequence of calibrated acceleration information into the second machine learning model;
determining a velocity value at the third time point based on the estimated true acceleration value;
integrating the velocity value with subsequent acceleration information obtained between the third time point and the second time point to determine a position of the game controller device at the second time point; and
controlling operations of a game application based on the determined position of the game controller device.

16. The computer-implemented method of claim 15, wherein using the calibrated acceleration information to estimate the true acceleration value reduces effects of at least one of the bias error or the scale factor error in the determination of the position of the game controller device at the second time point.

17. The computer-implemented method of claim 16, wherein reducing the effects of the at least one of the bias error or the scale factor error in the determination of the position of the game controller device improves accuracy of controlling the operations of the game application based on the determined position of the game controller device.

18. A non-transitory computer-readable storage medium storing computer-readable instructions thereon which, when executed by a computer, cause the computer to perform operations comprising:
receiving, from a game controller device including an inertial measurement unit, an output of the inertial measurement unit;
estimating posture information of the game controller device as a posture quaternion on a basis of the output received from the inertial measurement unit, wherein each component of the posture quaternion includes a vector representing a direction of a rotation axis represented by a global coordinate system different from a posture of the game controller device;
using a first machine learning model to estimate at least a bias error and a scale factor error included in information regarding acceleration output by the inertial measurement unit included in the game controller device by inputting the posture quaternion into the first machine learning model, the first machine learning model using the posture quaternion as input data and being in a state of having learned, by machine learning, at least a relation between the input data, the scale factor error, and the bias error included in the information regarding the acceleration output by the inertial measurement unit;
using the estimated bias error and scale factor error for a process of calibration of the acceleration output by the inertial measurement unit to generate calibrated acceleration information;
receiving a sequence of the calibrated acceleration information between a first time point and a second time point;
using a second machine learning model to estimate a true acceleration value at a third time point between the first time point and the second time point by inputting the sequence of calibrated acceleration information into the second machine learning model;
determining a velocity value at the third time point based on the estimated true acceleration value;
integrating the velocity value with subsequent acceleration information obtained between the third time point and the second time point to determine a position of the game controller device at the second time point; and
controlling operations of a game application based on the determined position of the game controller device.

19. The non-transitory computer-readable storage medium of claim 18, wherein using the calibrated acceleration information to estimate the true acceleration value reduces effects of at least one of the bias error or the scale factor error in the determination of the position of the game controller device at the second time point.

20. The non-transitory computer-readable storage medium of claim 19, wherein reducing the effects of the at least one of the bias error or the scale factor error in the determination of the position of the game controller device improves accuracy of controlling the operations of the game application based on the determined position of the game controller device.

* * * * *